US010378766B2

(12) United States Patent
Luo

(10) Patent No.: US 10,378,766 B2
(45) Date of Patent: Aug. 13, 2019

(54) LIGHTER

(71) Applicant: Zhuo Wen Luo, City of Industry, CA (US)

(72) Inventor: Zhuo Wen Luo, City of Industry, CA (US)

( * ) Notice: Subject to any disclaimer, the term of this patent is extended or adjusted under 35 U.S.C. 154(b) by 290 days.

(21) Appl. No.: 15/294,780

(22) Filed: Oct. 16, 2016

(65) Prior Publication Data

US 2018/0106479 A1 Apr. 19, 2018

(51) Int. Cl.
*F23Q 2/28* (2006.01)
*B23P 19/00* (2006.01)
*F23Q 2/173* (2006.01)

(52) U.S. Cl.
CPC .............. *F23Q 2/287* (2013.01); *B23P 19/00* (2013.01); *F23Q 2/173* (2013.01)

(58) Field of Classification Search
CPC ................................. F23Q 2/172; F23Q 2/287
USPC .............................. 431/6, 127, 153; 137/438
See application file for complete search history.

(56) References Cited

U.S. PATENT DOCUMENTS

D498,330 S * 11/2004 Koike .......................... D27/157
2006/0281039 A1* 12/2006 Luo ........................ F23Q 2/163
431/255

OTHER PUBLICATIONS https://www.amazon.com/Linse-Swivel-Nozzle-Lighters-pack/dp/B01DIAYL5I.*

* cited by examiner

*Primary Examiner* — Gregory L Huson
*Assistant Examiner* — Brandon Nelan
(74) *Attorney, Agent, or Firm* — Raymond Y. Chan; David and Raymond Patent Firm

(57) ABSTRACT

A piezoelectric lighter includes a lighter housing having a liquefied gas storage, a gas emitting nozzle extended from the liquefied gas storage, a piezoelectric unit disposed in the lighter housing, and a lighter cap slidably coupled on top of the lighter housing above the piezoelectric unit. The gas emitting nozzle is slidably received at a nozzle window of the lighter cap, wherein an exit opening of the gas emitting nozzle is embedded in the ceiling of the lighter cap to protect the exit opening of the gas emitting nozzle. When the lighter cap is depressed to expose the exit opening of the gas emitting nozzle above the ceiling of the lighter cap, the piezoelectric unit is depressed and the gas emission unit is actuated at the same time to produce a flame at the exit opening of the gas emitting nozzle.

24 Claims, 9 Drawing Sheets

211
44
42
401
211
40
214
30
23
12

LIGHTER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a lighter, and more particularly to a piezoelectric lighter which not only avoids the heat of the flame to the user's actuating finger but also minimizes the components of the lighter to simplify the assembling process of the lighter.

Description of Related Arts

Utility lighters are generally categorized into cigarette lighters and barbecue lighters. A conventional cigarette lighter, as shown in FIG. 1, comprises a lighter housing having a liquefied fuel storage, a gas nozzle extended to a ceiling of the lighter housing and communicating with the liquefied fuel storage for controlling a flow of gas, a piezoelectric unit disposed in the lighter housing for generating sparks when the piezoelectric unit is depressed, and an ignition button slidably mounted on the lighter housing, and a windshield coupled on the ceiling of the lighter housing to encircle around an exit opening of the gas nozzle. Accordingly, when the ignition button is depressed downwardly, the piezoelectric unit is depressed while the gas is released from the liquefied fuel storage to the gas nozzle and is ignited by the sparks.

The problem of the existing cigarette lighter is that the cigarette lighter requires different engaging mechanisms to incorporate with different components. For example, the cigarette lighter includes a sliding mechanism to ensure the sliding movement of the ignition button with respect to the lighter housing, an attaching engagement between the piezoelectric unit and the lighter housing, and a coupling mechanism to ensure the securing engagement between the windshield and the lighter housing.

The windshield has several functions of protecting the exit opening of the gas nozzle, providing a windproof ability of the ignited flame, and dissipating heat from the flame. However, when the lighter is ignited, the windshield will be heated by the flame. If the windshield is made of plastic, the windshield will be melted by the flame. Therefore, the windshield is preferred to be made of metal to prevent the melting of the windshield. However, since the ignition button is located adjacent to the windshield, the generated flame will heat the windshield and the heat will also dissipate from the windshield to the ignition button that may scald the user's finger. It is worth mentioning that the flame generated at the exit opening of the gas nozzle will be encircled by the windshield, such that it is difficult for the user to light up a cigarette or the like when the cigarette is positioned away from the exit opening of the gas nozzle.

Another problem of the existing cigarette lighter is that the assembling process thereof is complicated. All the components must be precisely installed into the lighter casing at different locations via the engaging mechanisms. If one of the engaging mechanisms is defected, the components cannot be correctly installed and the lighter will not be properly functioned. Therefore, the cigarette lighter must be preinstalled for storage and transportation. In other words, the cigarette lighter may be accidentally ignited or gas leakage during transportation or assembling process by simply actuating the ignition button.

As it is mentioned above, the barbecue lighter generally comprises the same components of the cigarette lighter, wherein the barbecue lighter further comprises an elongated nozzle tube extended from the lighter housing, such that the exit opening of the gas nozzle is extended to a free end of the nozzle tube. Therefore, the barbecue lighter is commonly used at home such as pilot light for stoves or outdoor activities such as fireplaces or camping since the barbecue lighter can provide a father ignition distance via the nozzle tube comparing with the cigarette lighter.

SUMMARY OF THE PRESENT INVENTION

The invention is advantageous in that it provides a lighter which enables the flame generated apart from the actuating finger of the user of the lighter to avoid the heat of the flame scald the user's actuating finger.

Another advantage of the invention is to provide a lighter which maximizes the contact area to the actuating finger of the user when igniting the lighter.

Another advantage of the invention is to provide a lighter which does not include any ignition button and windshield, so as to minimize the necessary components of the lighter so as to simplify the assembling process of the lighter and lower its manufacturing cost.

Another advantage of the invention is to provide a lighter, wherein an exit opening of the gas emitting nozzle is embedded in the ceiling of the lighter cap so as to protect the exit opening of the gas emitting nozzle at the non-ignition position of the lighter cap.

Another advantage of the invention is to provide a lighter, wherein the exit opening of the gas emitting nozzle is protruded out of the ceiling of the lighter cap at the ignition position of the lighter cap. Therefore, the lighter also serves as a barbecue lighter via a protruded portion of the gas emitting nozzle.

Another advantage of the invention is to provide a lighter, wherein the heat can be efficiently dissipated at the exit opening of the gas emitting nozzle without transmitting to the lighter cap.

Another advantage of the invention is to provide a lighter, wherein the ceiling of the lighter cap entirely is an enlarged flat depressible surface, such that the user is able to easily depress the lighter cap for ignition.

Another advantage of the invention is to provide a lighter, wherein the lighter cap and the gas emitting nozzle can be detached from the lighter housing to prevent any accidental ignition or gas leakage during transportation and assembling process.

Another advantage of the invention is to provide a lighter, wherein the sliding movement of the lighter cap is locked by the gas emitting nozzle, such that there is no additional securing mechanism for securing the lighter cap at the lighter housing.

Another advantage of the invention is to provide a lighter, wherein the assembling method of the lighter is simple and easy by coupling the lighter cap and the gas emitting nozzle to the lighter housing respectively.

Another advantage of the invention is to provide a lighter, wherein the gas emitting nozzle has a windproof ability even though the exit opening of the gas emitting nozzle is protruded from the ceiling of the lighter cap at the ignition position.

Another advantage of the invention is to provide a lighter, which does not require to alter the original structural design of the lighter, so as to minimize the manufacturing cost of the lighter housing incorporating with the lighter cap.

Another advantage of the invention is to provide a lighter, wherein no expensive or complicated structure is required to employ in the present invention in order to achieve the above mentioned objects. Therefore, the present invention successfully provides an economic and efficient solution for providing a simple configuration for the lighter to minimize the lighter components and to simplify the manufacturing process of the lighter.

Additional advantages and features of the invention will become apparent from the description which follows, and may be realized by means of the instrumentalities and combinations particular point out in the appended claims.

According to the present invention, the foregoing and other objects and advantages are attained by a lighter, comprising:

a lighter housing having a liquefied gas storage;

a gas emission unit for controlling a flow of gas, wherein the gas emission unit comprises a gas emitting nozzle extended from the liquefied gas storage;

a piezoelectric unit disposed in the lighter housing for generating sparks when the piezoelectric unit is depressed; and a lighter cap slidably coupled on top of the lighter housing at a position above the piezoelectric unit and being moved between a non-ignition position and an ignition position, wherein the lighter cap is guided to downwardly extend from a ceiling of the lighter cap at a position that an exit opening of the gas emitting nozzle is guided to extend to embed in the ceiling of the lighter cap so as to protect the exit opening of the gas emitting nozzle at the non-ignition position, such that when the lighter cap is depressed at the ignition position to expose the exit opening of the gas emitting nozzle above the ceiling of the lighter cap, the piezoelectric unit is depressed and the gas emission unit is actuated at the same time for releasing the gas to be ignited by the sparks so as to produce a flame at the exit opening of the gas emitting nozzle.

In accordance with another aspect of the invention, the present invention comprises a gas emission actuation device for a lighter which comprises a lighter housing having a liquefied gas storage and a piezoelectric unit disposed in the lighter housing for generating sparks when the piezoelectric unit is depressed, wherein the gas emission actuation device comprises:

a gas emission unit for controlling a flow of gas, wherein the gas emission unit comprises a gas emitting nozzle arranged for extending from the liquefied gas storage; and a lighter cap arranged for slidably coupling on top of the lighter housing at a position above the piezoelectric unit, wherein the lighter cap is guided to downwardly extend from a ceiling of the lighter cap at a position that an exit opening of the gas emitting nozzle is guided to extend to embed in the ceiling of the lighter cap so as to protect the exit opening of the gas emitting nozzle, such that when the lighter cap is depressed to expose the exit opening of the gas emitting nozzle above the ceiling of the lighter cap, the lighter cap is arranged for depressing the piezoelectric unit and for actuating the gas emission unit at the same time to release the gas to be ignited by the sparks so as to produce a flame at the exit opening of the gas emitting nozzle.

In accordance with another aspect of the invention, the present invention comprises a lighter cap for a lighter which comprises a lighter housing having a liquefied gas storage, a gas emitting nozzle extended from the liquefied gas storage for controlling a flow of gas, and a piezoelectric unit disposed in the lighter housing for generating sparks when the piezoelectric unit is depressed, wherein the lighter cap comprises a cap body arranged for slidably coupling on top of the lighter housing at a position above the piezoelectric unit and being moved between a non-ignition position and an ignition position, wherein a ceiling of the cap body entirely forms an enlarged flat depressible surface to depress the cap body, such that the cap body is downwardly depressed from the non-ignition position to the ignition position for depressing the piezoelectric unit and for actuating the gas emitting nozzle at the same time to produce a flame at an exit opening of the gas emitting nozzle.

In accordance with another aspect of the invention, the present invention comprises a method of assembling a lighter, comprising the following steps.

(A) Form a lighter housing with a liquefied gas storage therein.

(b) Dispose a piezoelectric unit in the lighter housing for generating sparks when the piezoelectric unit is depressed.

(c) Slidably couple a lighter cap on top of the lighter housing at a position above the piezoelectric unit, wherein the lighter cap is slidingly and downwardly extended from a ceiling of the lighter cap.

(d) Couple a gas emitting nozzle at the lighter housing to communicate with the liquefied gas storage and slidingly extend the gas emitting nozzle to embed an exit opening of the gas emitting nozzle in the ceiling of the lighter cap, such that when the lighter cap is downwardly depressed to expose the exit opening of the gas emitting nozzle above the ceiling of the lighter cap, the lighter cap depresses the piezoelectric unit and actuates the gas emitting nozzle at the same time to produce a flame at the exit opening of the gas emitting nozzle.

In accordance with another aspect of the invention, the present invention comprises an ignition method of a lighter, comprising the following steps.

(1) Embed an exit opening of a gas emitting nozzle in a ceiling of a lighter cap at a non-ignition position that the lighter cap is slidably coupled on top of a lighter housing at a position above a piezoelectric unit.

(2) Expose the exit opening of the gas emitting nozzle from the ceiling of the lighter cap at an ignition position by applying a depressing force on the ceiling of the lighter cap to depress the piezoelectric unit and to actuate the gas emitting nozzle at the same time so as to produce a flame at the exit opening of the gas emitting nozzle.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
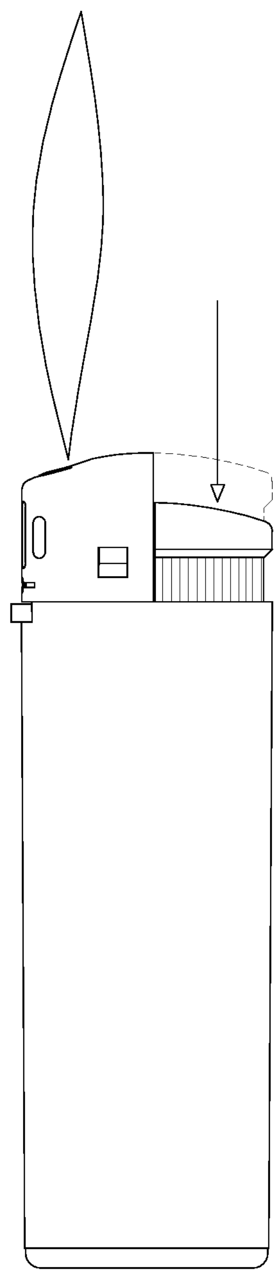
FIG. 1 is schematic view of a conventional piezoelectric lighter.
Figure 2:
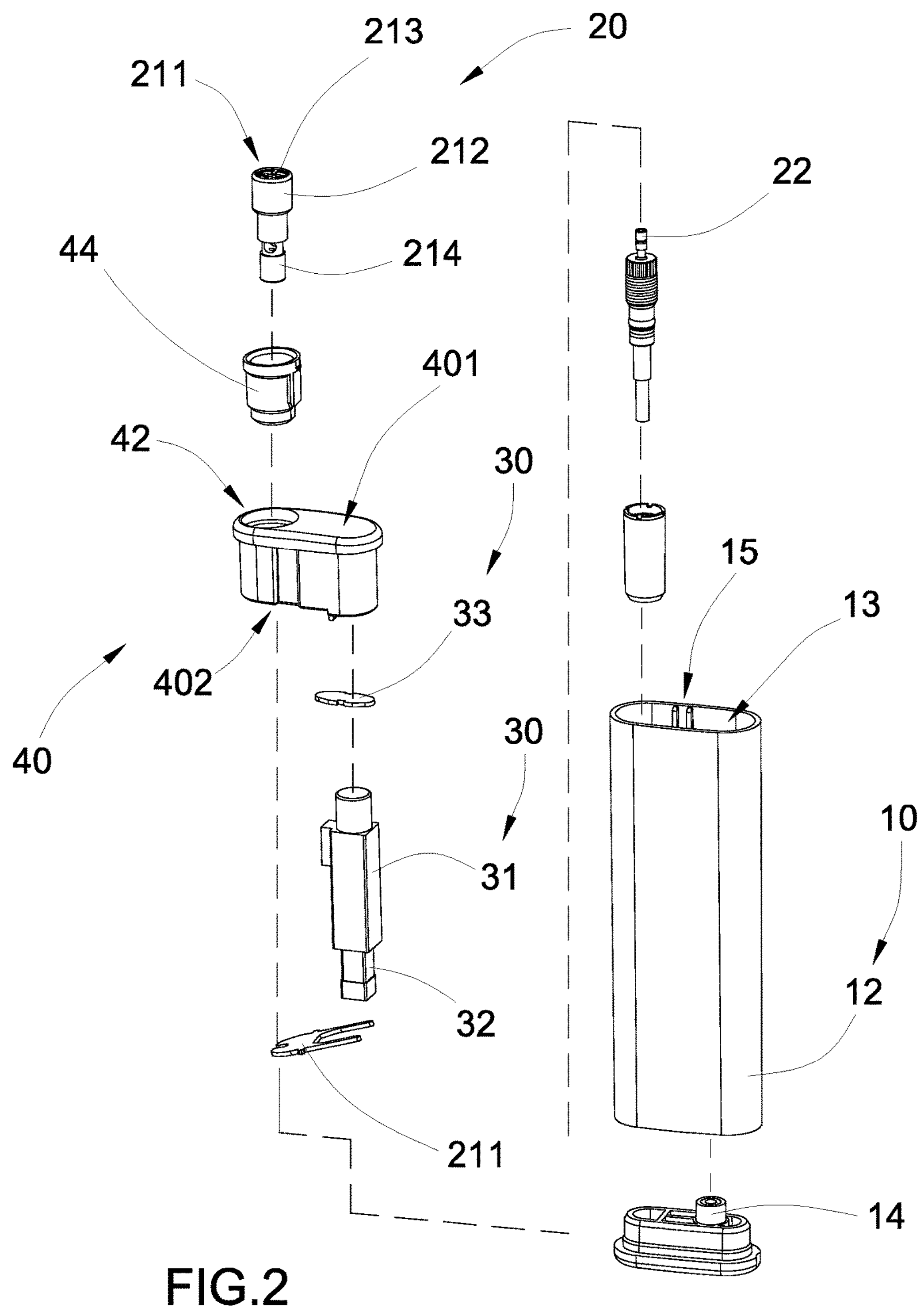
FIG. 2 is an exploded perspective view of a lighter according to a preferred embodiment of the present invention.
Figure 3:
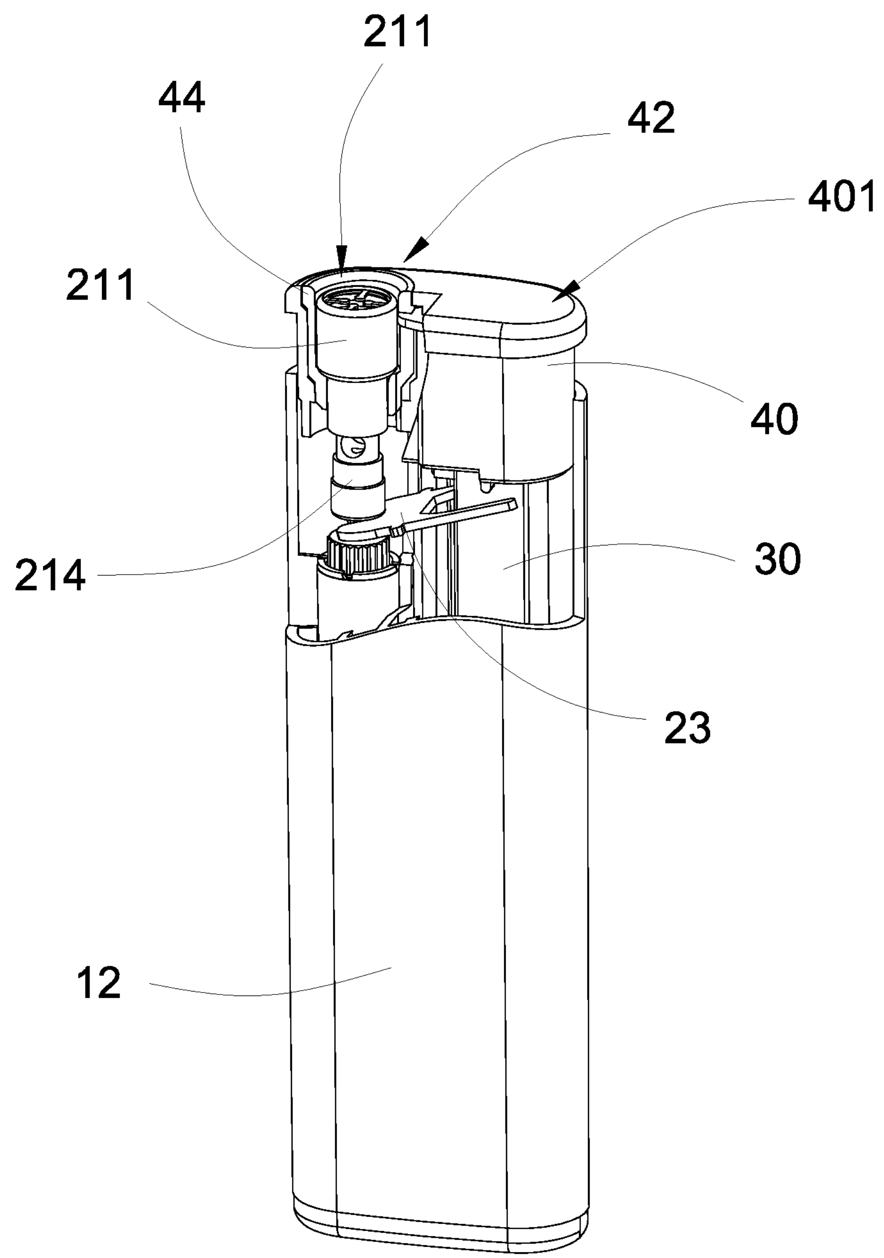
FIG. 3 is a perspective view of the lighter according to the above preferred embodiment of the present invention.
Figure 4:
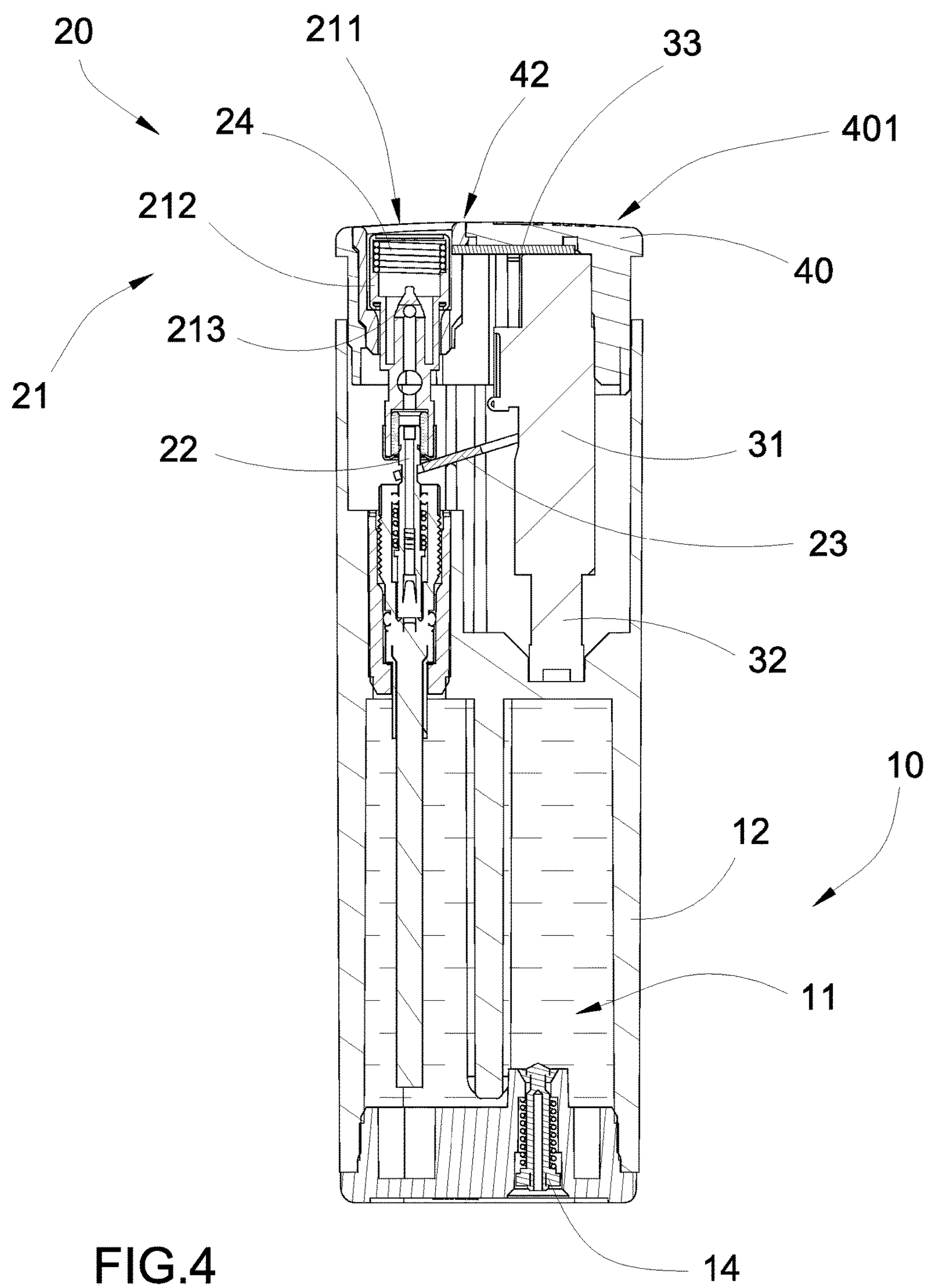
FIG. 4 is a sectional view of the lighter according to the above preferred embodiment of the present invention.

Referring to FIGS. 2 to 4 of the drawings, a lighter according to a preferred embodiment of the present invention is illustrated, wherein the lighter comprises a lighter housing 10, a gas emission unit 20, a piezoelectric unit 30, and a lighter cap 40.

The lighter housing 10 has a liquefied gas storage 11. In particular, the lighter housing 10 comprises a casing 12 defining the liquefied gas storage 11 at a bottom portion of the casing 12 and a receiving chamber 13 at an upper portion, such that the receiving chamber 13 is located above the liquefied gas storage 11. Preferably, the liquefied gas storage 11 is a sealed gas chamber that liquefied gas is stored therein. A filling valve 14 is provided at a bottom wall of the casing 12 for filling the gas into the liquefied gas storage 11.

The gas emission unit 20 is for controlling a flow of gas from the liquefied gas storage 11. The gas emission unit 20 comprises a gas emitting nozzle 21 extended from the liquefied gas storage 11 that the gas can be controllably released from the liquefied gas storage 11 to an exit opening 211 of the gas emitting nozzle 21. In particular, the gas emission unit 20 further comprises a gas valve 22 operatively coupled to the liquefied gas storage 11, wherein a valve tip of the gas valve 22 is detachably coupled at a bottom end of the gas emitting nozzle 21. Therefore, when the gas valve 22 is actuated for releasing the gas from the liquefied gas storage 11, the gas will be guided to pass through the gas emitting nozzle 21. Accordingly, a gas actuating lever 23 is coupled at the gas valve 22 to controllably actuate the gas valve 22. It is worth mentioning that the gas emitting nozzle 21, the gas valve 22, and the gas actuating lever 23 are supported within the receiving chamber 13 of the lighter housing 10.

The piezoelectric unit 30 is disposed in the lighter housing 10 for generating sparks when the piezoelectric unit 30 is depressed. In particular, the piezoelectric unit 30 comprises a piezoelectric generator 31 disposed in the receiving chamber 13 of the lighter housing 10, a depressible member 32 movably extended from the piezoelectric generator 31, and a spark generating tip 33 extended toward the exit opening 211 of the gas emitting nozzle 21. Therefore, when the piezoelectric generator 31 and the depressible member 32 are pressed for generating the sparks at the spark generating tip 33, the gas released at the exit opening 211 of the gas emitting nozzle 21 will be ignited to produce a flame at the exit opening 211 of the gas emitting nozzle 21. Accordingly, the spark generating tip 33 are formed by a metal plate coupled at a bottom side of the lighter cap 40, wherein the metal plate is electrically conducted with the piezoelectric generator 31 and the end of the metal plate extended toward the exit opening 211 of the gas emitting nozzle 21 to serve as the spark generating tip 33.

It is worth mentioning that one end of the gas actuating lever 23 is coupled at the gas valve 22 and an opposed end of the gas actuating lever 23 is coupled at the piezoelectric unit 30. Therefore, when the piezoelectric unit 30 is depressed, the gas valve 22 is lifted up by the pivotal movement of the gas actuating lever 23 for releasing the gas from the liquefied gas storage 11. When the piezoelectric unit 30 is upwardly moved back to its original position, the gas valve 22 is dropped down via the gas actuating lever 23 for closing the gas valve 22 so as to prevent the gas releasing from the liquefied gas storage 11.

The lighter cap 40 is slidably coupled on top of the lighter housing 10 at a position above the piezoelectric unit 30 and being moved between a non-ignition position and an ignition position. As shown in FIGS. 2 to 4, the lighter cap 40 comprises a cap body 41 slidably coupled at the receiving cavity 13 of the lighter housing 10, wherein a ceiling 401 of the cap body 41 entirely forms an enlarged flat depressible surface to depress the cap body 41.

Figure 5A:
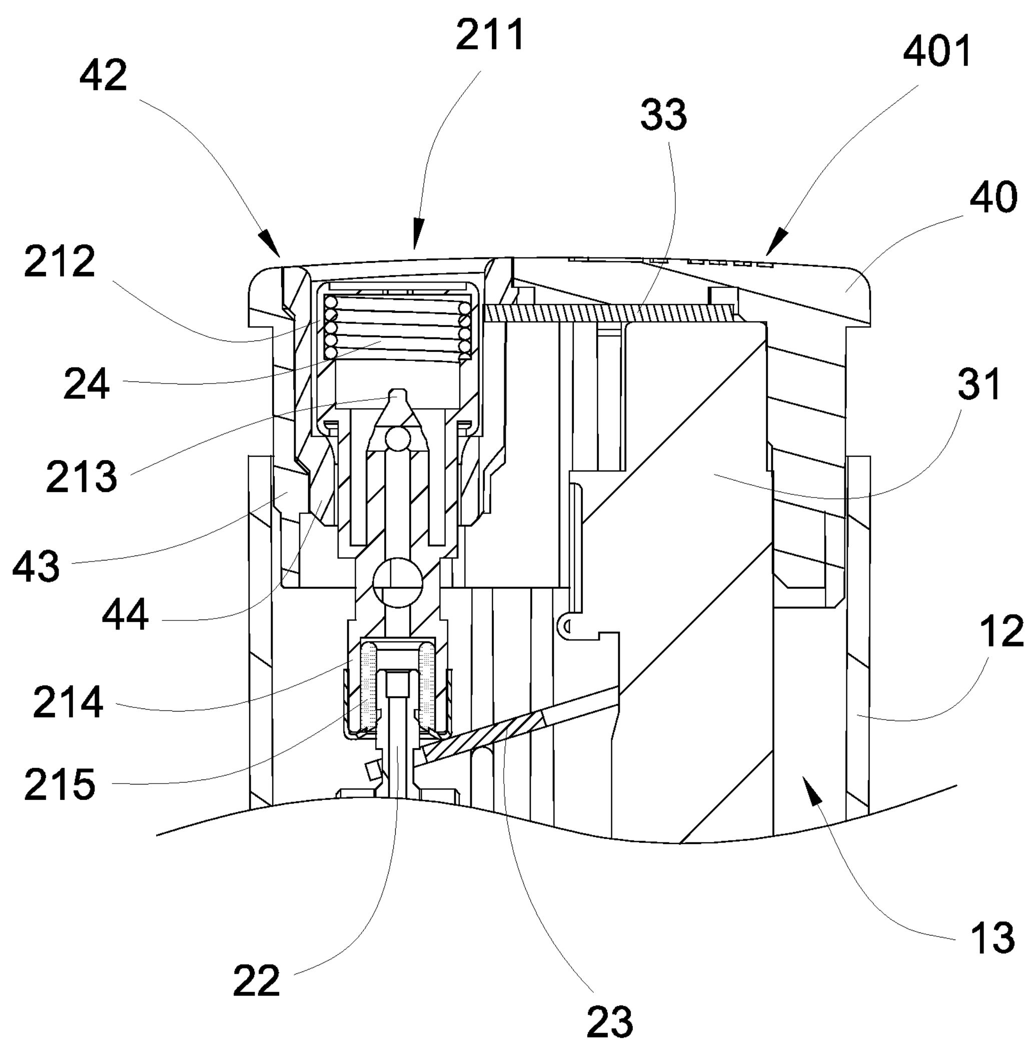
FIG. 5A illustrates a non-ignition position of the lighter cap according to the above preferred embodiment of the present invention.
Figure 5B:
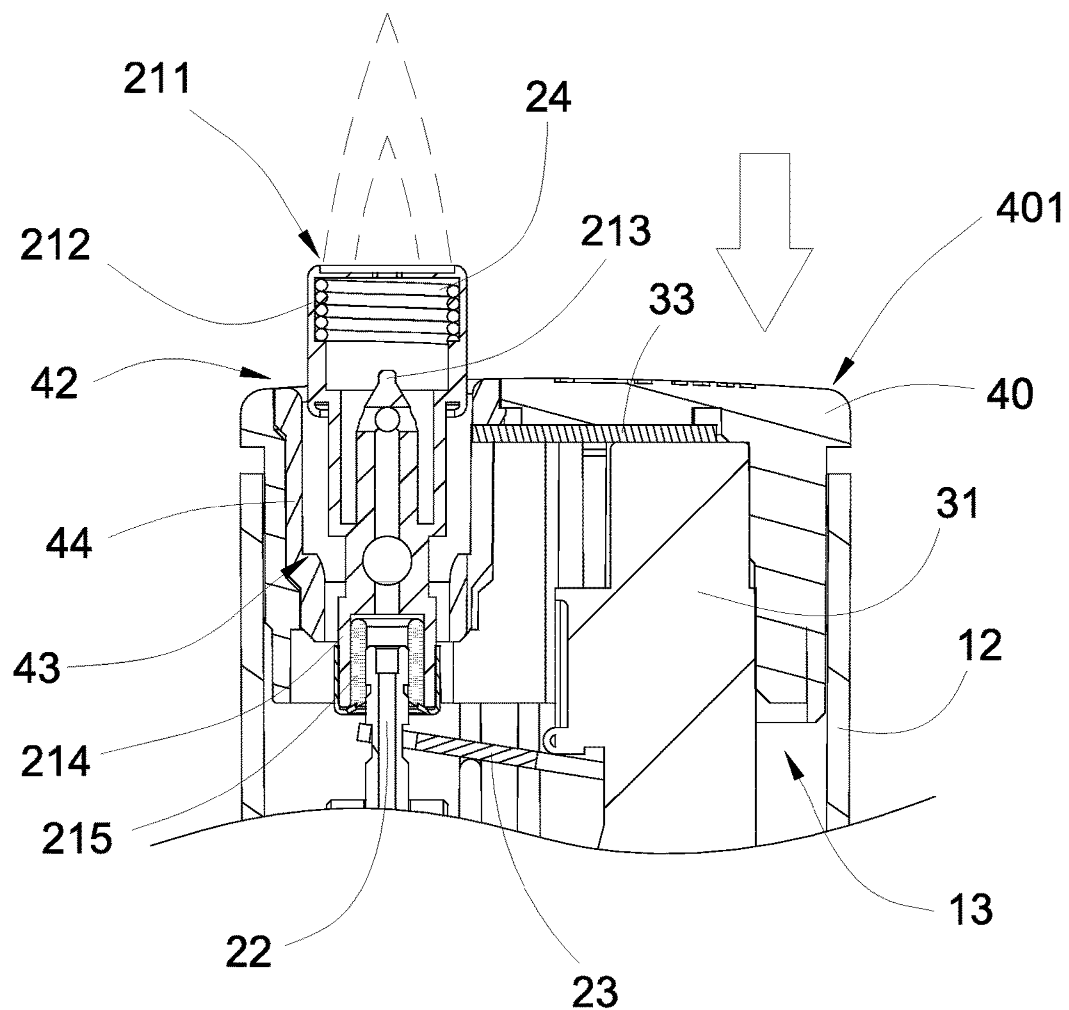
FIG. 5B illustrates an ignition position of the lighter cap according to the above preferred embodiment of the present invention.

At the non-ignition position as shown in FIG. 5A, the cap body 41 of the lighter cap 40 is upwardly pushed by the piezoelectric unit 30. At the ignition position as shown in FIG. 5B, the cap body 41 of the lighter cap 40 is pressed downwardly via a depressing force applied on the ceiling 401 thereof for depressing the piezoelectric unit 30 and for actuating the gas emitting nozzle 21 at the same time to produce the flame at the exit opening 211 of the gas emitting nozzle 21.

In order to provide a sliding movement of the lighter cap 40, the lighter housing 10 further has two sliding tracks 15 formed at two inner walls of the receiving chamber 13, wherein the lighter cap 40 further comprises two corresponding sliding members 402 formed at two outer walls of the cap body 41 to slidably engage with the sliding tracks 15 of the lighter housing 10 respectively.

Figure 7:
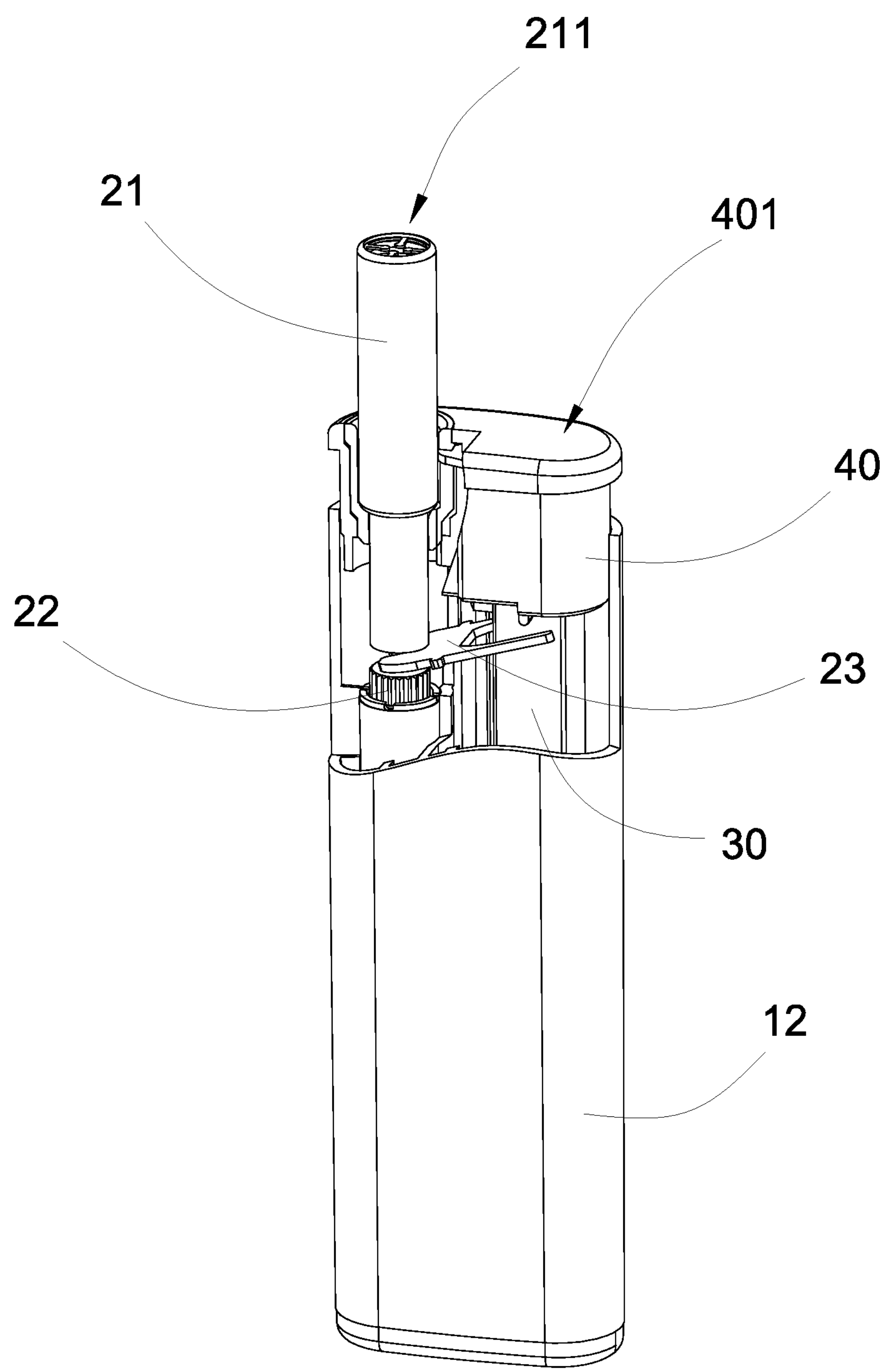
FIG. 7 illustrates a modification of the lighter as a barbecue lighter according to the above preferred embodiment of the present invention.

According to the preferred embodiment, the lighter cap 40 has a nozzle window 42 downwardly extended from the ceiling 401 of the cap body 41 of the lighter cap 40, wherein the gas emitting nozzle 21 is slidably extended through the nozzle window 42 at a position that the exit opening 211 of the gas emitting nozzle 21 is aligned with the ceiling 401 of the cap body 41 of the lighter cap 40. In one embodiment, the nozzle window 42 can be a through slot vertically formed at the lighter cap 40 and a top opening of the through slot is formed at the ceiling of the cap body 41 of the lighter cap 40. In other words, the exit opening 211 of the gas emitting nozzle 21 is embedded in the ceiling 401 of the lighter cap 40 so as to protect the exit opening 211 of the gas emitting nozzle 21 at the non-ignition position as shown in FIGS. 3 and 5A. At the ignition position, the lighter cap 40 is depressed to expose the exit opening 211 of the gas emitting nozzle 21 above the ceiling 401 of the lighter cap 40. Accordingly, the piezoelectric unit 30 is depressed and the gas emission unit 20 is actuated at the same time for releasing the gas to be ignited by the sparks so as to produce the flame at the exit opening 211 of the gas emitting nozzle 21. Therefore, the user is able to accurately aim the cigarette at the exit opening 211 of the gas emitting nozzle 21 where the flame is formed thereat. In other words, a portion of the gas emitting nozzle 21 is protruded from the ceiling 401 of the lighter cap 40 during the ignition of the lighter, such that the protruded portion of the gas emitting nozzle 21 will form an elongated nozzle tube of a barbecue lighter, as shown in FIG. 7. It is worth mentioning that since the exit opening 211 of the gas emitting nozzle 21 is protruded and exposed out of the ceiling 401 of the lighter cap 40 at the ignition position, the heat can be efficiently dissipated at the exit opening 211 of the gas emitting nozzle 21 without transmitting to the lighter cap 40.

As shown in FIGS. 2 to 4, the gas emitting nozzle 21 is a windproof nozzle to generate the windproof flame. The gas emitting nozzle 21 has an annular retention hood 212 formed at the exit opening 211 and a nozzle tip 213 encircled within the retention hood 212. The gas emitting nozzle 21 is arranged to gasify the liquefied gas released from the liquefied gas storage 11. Then, the gas is released from the nozzle tip 213 and the sparks are generated toward the retention hood 212 to ignite the gas from the nozzle tip 213 to form the windproof flame. Therefore, the retention hood 212 has a windproof ability for the flame at the nozzle tip 213. It is worth mentioning that at the non-ignition position, a top side of the retention hood 212 is embedded in the ceiling 401 of the lighter cap 40 at a position that the top side of the retention hood 212 is at the same level or below the ceiling 401 of the lighter cap 40. At the ignition position, the top side of the retention hood 212 is protruded from the ceiling 401 of the lighter cap 40. It is worth mentioning that the retention hood 212 is preferably made of metal, such that the heat can be efficiently dissipated at the exit opening 211 of the gas emitting nozzle 21.

Preferably, the gas emission unit 20 further comprises a spark guiding element 24 coupled within the retention hood 212 at the exiting opening 211 of the gas emitting nozzle 21 and supported above the nozzle tip 213 thereof. As it is mentioned above, the spark generating tip 33 are formed at the end of the metal plate, wherein when the spark is generated at the spark generating tip 33 toward the exit opening 211 of the gas emitting nozzle 21, the spark guiding element 24 transmits the spark toward the nozzle tip 213 to ignite the gas emitting therefrom. In one embodiment, the spark guiding element 24 is a coil spring coaxially coupled with the retention hood 212 at the exiting opening 211 of the gas emitting nozzle 21, wherein a bottom end of the spark guiding element 24 is located above the nozzle tip 213, such that the spark will transmit to the bottom end of the sparking guiding element 24 toward the nozzle tip 213.

According to the preferred embodiment, the gas emitting nozzle 21 further has a tubular coupling head 214 downwardly extended from the nozzle tip 213 to couple at the gas valve 22. In particular, the gas valve 22 is slidably inserted into the coupling head 214 to emit the gas from the gas valve 22 to the nozzle tip 213. For preventing any gas leakage, the gas emitting nozzle 21 further comprises a sealing element 215 provided in the coupling head 214 to seal the gas valve 22 within the coupling head 214. Preferably, the sealing element 215 can be a sealing ring. In other words, the sealing element 215 is frictionally engaged with the gas valve 22 to seal and couple the gas emitting nozzle 21 with the gas valve 22.

In addition, the gas actuating lever 23 is coupled at the gas valve 22 to controllably actuate the gas valve 22. In other words, when the gas valve 22 is lifted upward, the gas valve 22 is opened to release the gas to the nozzle tip 213. Accordingly, the gas actuating lever 23 is coupled at the gas valve 22 at a position below the bottom of the gas emitting nozzle 21. As shown in FIGS. 4, 5A and 5B, the gas actuating lever 23 is coupled at the gas valve 22 at a position below a bottom end of the coupling head 214, such that when the corresponding end of the gas actuating lever 23 is pivotally lifted up, the coupling head 214 is driven to move upward by the gas actuating lever 23 in order to lift up the gas valve 22. In other words, the gas valve 22 is lifted up by the coupling head 214 of the gas emitting nozzle 21 via the pivotal movement of the gas actuating lever 23. Therefore, when the lighter cap 40 is pressed downwardly at the ignition position, the gas emitting nozzle 21 will also be lifted up corresponding to the upward movement of the gas valve 22 via the pivotal movement of the gas actuating lever 23. It is worth mentioning that during the ignition of the lighter of the present invention, the movement of the lighter cap 40 is opposite to the movement of the gas emitting nozzle 21. The lighter cap 40 is moved downwardly while the gas emitting nozzle 21 is moved upwardly at the same time. Unlike the conventional lighter, only the button is pressed downwardly while the nozzle is stationary.

It is worth mentioning that the gas nozzle of the conventional lighter must include a notch to interlock with the gas lever. The present invention provides a simple structure to ensure the engagement among the gas emitting nozzle 21, the gas valve 22, and the gas actuating lever 23. In addition, when the gas valve 22 is detachably engaged with the coupling head 214, the engagement therebetween will ensure the gas emitting nozzle 21 to be securely and air-sealedly coupled to the gas valve 22 and will ensure the corresponding end of the gas actuating lever 23 to be locked at the gas valve 22. The manufacturing process will be simplified by slidably inserting the gas valve 22 into the coupling head 214 of the gas emitting nozzle 21.

Figure 6:
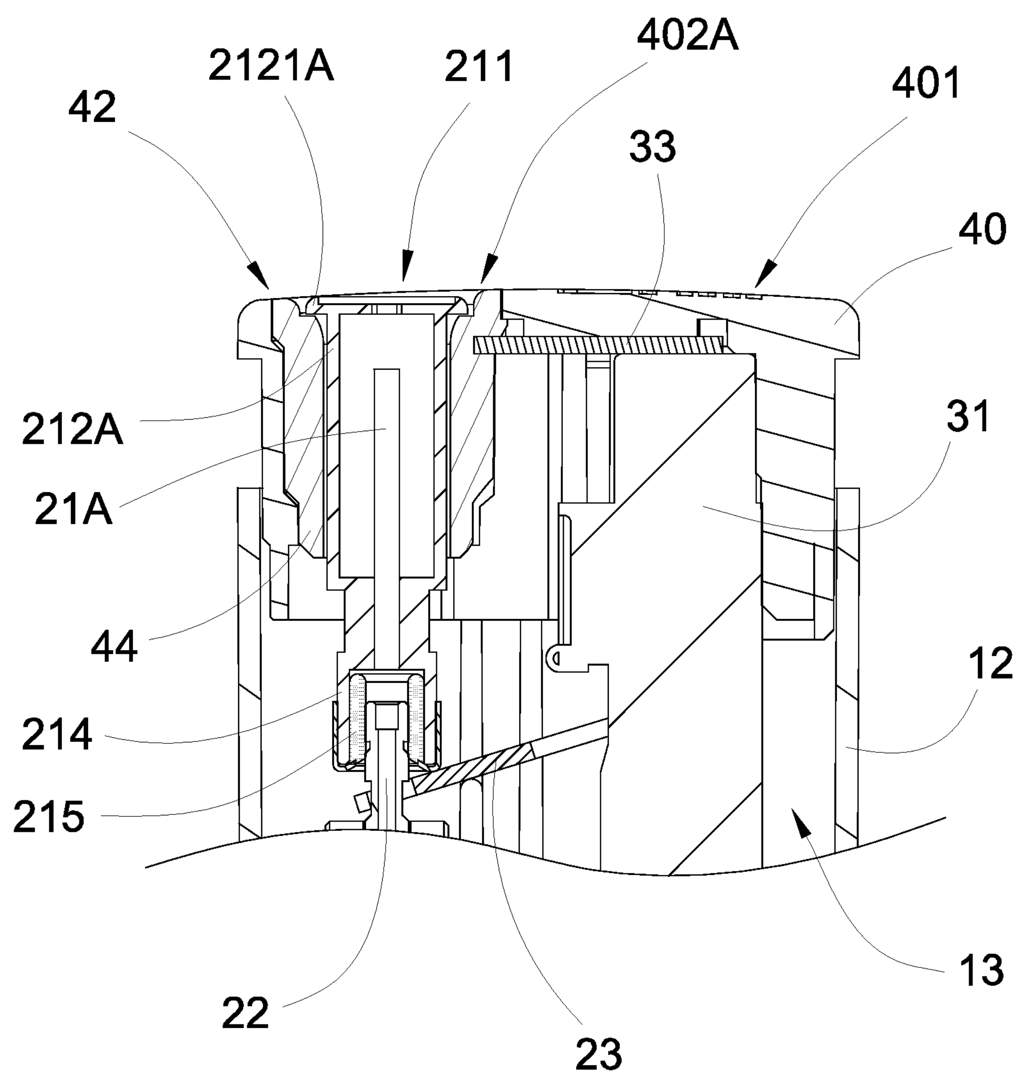
FIG. 6 illustrates an alternative mode of the lighter according to the above preferred embodiment of the present invention.

Alternatively, the gas emitting nozzle 21A is a regular nozzle to generate the visible flame, as shown in FIG. 6. Therefore, the lighter manufacturer can selectively assemble different gas emitting nozzle 21, 21A to the gas valve 22 to produce different flames. In other words, when the gas emitting nozzle 21 is coupled to the gas valve 22, the piezoelectric lighter of the present invention will produce the windproof flame and when the gas emitting nozzle 21A is coupled to the gas valve 22, the piezoelectric lighter of the present invention will produce the visible flame. Likewise, the user is able to interchange the gas emitting nozzles 21, 21A with each other by simply detaching the original gas emitting nozzle 21, 21A from the gas valve 22 and coupling the desired gas emitting nozzle 21A, 21 back to the gas valve 22.

According to the preferred embodiment, the lighter of the present invention is arranged to minimize different securing mechanisms. The first securing mechanism is omitted for securing the lighter cap 40 to the lighter housing 10. It is worth mentioning that the sliding tracks 15 and the sliding members 402 are provided to enable the lighter cap 40 to move between the non-ignition position and the ignition position, which do not provide any securing engagement between the lighter cap 40 and the lighter housing 10. In one embodiment, the lighter cap 40 is secured at the lighter housing 10 by the gas emitting nozzle 21. Therefore, when the gas emitting nozzle 21 is coupled within the lighter housing 10, the lighter cap 40 cannot be removed from the lighter housing 10. In other words, when the bottom end of the gas emitting nozzle 21 is coupled at the valve tip of the gas valve 22, the lighter cap 40 will be retained in a slidably movable manner to only move between the non-ignition position and the ignition position.

As shown in FIGS. 5A and 5B, the lighter cap 40 further comprises a limiting rim 43 integrally formed at an inner circumferential surface of the nozzle window 42 to engage with the gas emitting nozzle 21 so as to limit an upward sliding movement of the lighter cap 40. The upward sliding movement of the lighter cap 40 refers to a further upward movement of the lighter cap 40 at the non-ignition position. In other words, when the lighter cap 40 is upwardly moved back to the non-ignition position from the ignition position, the lighter cap 40 is blocked by the gas emitting nozzle 21 so as to retain the lighter cap 40 at the non-ignition position.

Accordingly, the limiting rim 43 is radially extended from the inner circumferential surface of the nozzle window 42, such that an inner diameter size of the limiting rim 42 is smaller than a diameter size of the nozzle window 42. In one embodiment, the retention hood 212 is formed at the exit opening 211 of the gas emitting nozzle 21 at a position above the limiting rim 43, such that when the lighter cap 40 is upwardly moved, the limiting rim 43 is engaged with a bottom edge of the retention hood 212 to prevent the lighter cap 40 from being further moved upwardly.

As shown in FIGS. 2 to 4, the lighter cap 40 further comprises a tubular heat resistance member 44 coupled at the nozzle window 42, wherein the retention hood 212 of the gas emitting nozzle 21 is encircled within the heat resistance member 44. The heat resistance member 44 will further prevent the heat from the gas emitting nozzle 21 transferring to the lighter cap 40. It is worth mentioning that the heat resistance member 44 is optional. Even though there is no heat resistance member 44, the heat will not be effectively distributed to the lighter cap 40. At the ignition position, the top side of the retention hood 212 is slid out of a top opening of the heat resistance 44 and is protruded from the ceiling 401 of the lighter cap 40. Therefore, the heat can be efficiently dissipated at the exit opening 211 of the gas emitting nozzle 21 to the surroundings.

Figure 5C:
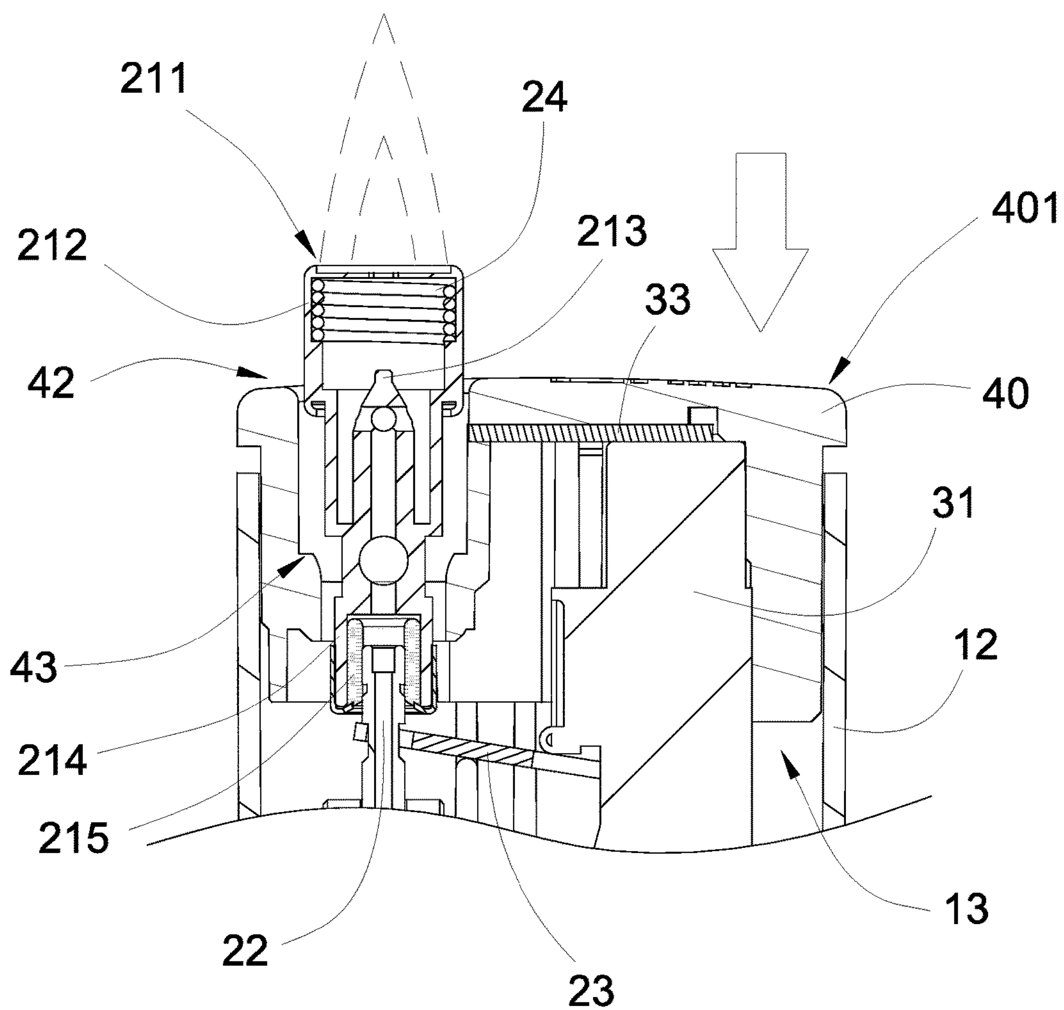
FIG. 5C illustrates the lighter cap without the heat resistance member according to the above preferred embodiment of the present invention.

As it is mentioned above, the limiting rim 43 is integrally formed at the inner circumferential surface of the nozzle window 42 when the heat resistance member 44 is omitted, as shown in FIG. 5C. When the heat resistance member 44 is provided at the lighter cap 40, as shown in FIG. 5A, the limiting rim 43 will be integrally formed at an inner circumferential surface of the heat resistance member 44, such that the limiting rim 43 at the heat resistance member 44 is engaged with the bottom edge of the retention hood 212 to prevent the lighter cap 40 from being further moved upwardly.

Alternatively, the retention hood 212A has a top annular rim 2121A extended radially and outwardly, as shown in FIG. 6, wherein a diameter size of the top annular rim 2121A is larger than a diameter size of the bottom end of the retention hood 212A. Therefore, when the lighter cap 40 is upwardly moved, the top annular rim 2121A of the retention hood 212A is engaged with the ceiling 401 of the lighter cap 40 to prevent the lighter cap 40 from being further moved upwardly. In other words, the further upward movement of the lighter cap 40 is blocked by the top annular rim 2121A of the retention hood 212A. For hiding and embedding the exit opening 211 of the gas emitting nozzle 21 at the ceiling 401 of the lighter cap 40, the lighter cap 40 further has an indented cavity 402A formed at the ceiling 401 of the lighter cap 40 around the nozzle window 42, such that when the lighter cap 40 is upwardly moved, the top annular rim 2121A of the retention hood 212A is received at the indented cavity 402A to ensure the exit opening 211 of the gas emitting nozzle 21A to be aligned with the ceiling 401 of the lighter cap 40.

It is worth mentioning that the gas emission unit 20 and the lighter cap 40 are combined to form a gas emission actuation device for any existing piezoelectric lighter. In other words, the gas emission unit 20 and the lighter cap 40 can be incorporated with the existing piezoelectric lighter having the piezoelectric unit.

In order to ignite the lighter, the present invention further provides an ignition method which comprises the following steps.

(1) Embed the exit opening 211 of the gas emitting nozzle 21 in the ceiling 401 of the lighter cap 40 at the non-ignition position. Accordingly, when the exit opening 211 of the gas emitting nozzle 21 is embedded in the ceiling 401 of the lighter cap 40, the lighter cap 40 is retained at the non-ignition position. Therefore, the exit opening 211 of the gas emitting nozzle 21 is protected by the lighter cap 40. It is worth mentioning that the lighter cap 40 is pushed by the piezoelectric unit 30 and at the same time is blocked by the gas emitting nozzle 21 to prevent the further upward movement of the lighter cap 40.

(2) Expose the exit opening 211 of the gas emitting nozzle 21 from the ceiling 401 of the lighter cap 40 at an ignition position. In order to expose the exit opening 211 of the gas emitting nozzle 21 from the ceiling 401 of the lighter cap 40, the user is able to apply the depressing force on the ceiling 401 of the lighter cap 40. It is worth mentioning that since the entire ceiling 401 of the lighter cap 40 is the enlarged flat depressible surface, the user is able to easily apply the depressing force to press on the lighter cap 40 for ignition of the lighter.

The lighter cap 40 is pressed downward to depress the piezoelectric unit 30 and to actuate the gas emitting nozzle 21 at the same time so as to produce the flame at the exit opening 211 of the gas emitting nozzle 21. It is worth mentioning that when the lighter cap 40 is depressed, the piezoelectric unit 30 is compressed and the gas valve 22 is lifted up. Therefore, the sparks generated by the piezoelectric unit 30 will ignite the gas released from the exit opening 211 of the gas emitting nozzle 21 to produce the flame.

(3) Release the depressing force on the ceiling 401 of the lighter cap 40, wherein the lighter cap 40 is upwardly pushed by the piezoelectric unit 30 to move the lighter cap 40 back to the non-ignition position from the ignition position so as to embed the exit opening 211 of the gas emitting nozzle 21 back in the ceiling 401 of the lighter cap 40. Accordingly, the gas valve 22 is dropped down to its closed position when the lighter cap 40 is moved back to the non-ignition position.

The present invention further provides an assembling method of the lighter which comprises the following steps.

(A) Form the lighter housing 10 with the liquefied gas storage 11 therein, wherein the liquefied gas storage 11 is pre-formed in the lighter housing 10. Preferably, the gas valve 22 is pre-installed into the lighter housing 10 to communicate with the liquefied gas storage 11.

(b) Dispose the piezoelectric unit 30 in the lighter housing 10 for generating sparks when the piezoelectric unit 30 is depressed. Preferably, the gas actuating lever 23 is pre-installed in the lighter housing 10 that one end of the gas actuating lever 23 is coupled at the gas valve 22 and an opposed end of the gas actuating lever 23 is coupled at the piezoelectric unit 30.

(c) Slidably couple the lighter cap 40 on top of the lighter housing 10 at a position above the piezoelectric unit 30. Accordingly, the lighter cap 40 is slidable with the lighter cap 40 via the sliding tracks 15 and the sliding members 402.

(d) Couple the gas emitting nozzle 21 at the lighter housing 10 to communicate with the liquefied gas storage 11 and extend the gas emitting nozzle 21 through the nozzle window 42 to embed the exit opening 211 of the gas emitting nozzle 21 in the ceiling 401 of the lighter cap 40. Therefore, when the lighter cap 40 is downwardly depressed to expose the exit opening 211 of the gas emitting nozzle 21 above the ceiling 401 of the lighter cap 40, the lighter cap 40 depresses the piezoelectric unit 30 and actuates the gas emitting nozzle 21 at the same time to produce the flame at the exit opening 211 of the gas emitting nozzle 21.

It is worth mentioning that the lighter cap 40 should be coupled at the lighter housing 10 before the gas emitting nozzle 21 is coupled thereat. It is because the lighter cap 40 is locked by the gas emitting nozzle 21 to prevent the further upward movement of the lighter cap 40 at the non-ignition position. In particular, the nozzle window 42 is coaxially aligned with the valve tip of the gas valve 22, such that when the gas emitting nozzle 21 is slidably passed through the nozzle window 42, the bottom end of the gas emitting nozzle 21 is aligned coupled with the valve tip of the gas valve 22. Once the bottom end of the gas emitting nozzle 21 is aligned coupled with the valve tip of the gas valve 22, the lighter cap 40 is held in position. In one embodiment, when the lighter cap 40 is upwardly moved, the limiting rim 43 is engaged with the bottom edge of the retention hood 212 to prevent the lighter cap 40 from being further moved upwardly. Alternatively, when the lighter cap 40 is upwardly moved, the top annular rim 2121A of the retention hood 212A is engaged with the ceiling 401 of the lighter cap 40 and is received at the indented cavity 402A to prevent the lighter cap 40 from being further moved upwardly.

It is worth mentioning that the lighter of the present invention can be pre-assembled as a semi product lighter which comprises the lighter housing 10, the gas valve 22 and the piezoelectric unit 30. Then, the semi product lighter can be packed, shipped, and stored for safety purpose, so as to prevent the accidental ignition or gas leakage of the lighter. Then, the semi product lighter can be completely assembled by simply coupling the gas emitting nozzle 21 and the lighter cap 40 thereat. In other words, the lighter can be manufactured by the pre-assembling step and a final assembling step.

The pre-assembling step, which is arranged to form the semi product lighter, comprises the following steps.

(I) Form the lighter housing 10 with the liquefied gas storage 11 therein, wherein the liquefied gas storage 11 is pre-formed in the lighter housing 10. The gas valve 22 is pre-installed into the lighter housing 10 to communicate with the liquefied gas storage 11.

(II) Dispose the piezoelectric unit 30 in the lighter housing 10 for generating sparks when the piezoelectric unit 30 is depressed. The gas actuating lever 23 is pre-installed in the lighter housing 10 that one end of the gas actuating lever 23 is coupled at the gas valve 22 and an opposed end of the gas actuating lever 23 is coupled at the piezoelectric unit 30.

The final assembling step, which is arranged to form the gas emission actuation device, comprises the following steps.

(III) Slidably couple the lighter cap 40 on top of the lighter housing 10 at a position above the piezoelectric unit 30 of the semi product lighter. Accordingly, the lighter cap 40 is slidable with the lighter cap 40 via the sliding tracks 15 and the sliding members 402.

(IV) Couple the gas emitting nozzle 21 at the lighter housing 10 to communicate with the liquefied gas storage 11 by coupling the gas emitting nozzle 21 to the gas valve and extend the gas emitting nozzle 21 through the nozzle window 42 to embed the exit opening 211 of the gas emitting nozzle 21 in the ceiling 401 of the lighter cap 40.

Then, the assembling of the lighter is completed. Once the gas is filled into the liquefied gas storage 11 via the filling valve 14, the lighter is ready to use. It is worth mentioning that the lighter of the present invention does not require any conventional ignition button or windshield so as to minimize the necessary components of the lighter and to simplify the assembling process of the lighter. Therefore, the material cost of the lighter of the present invention will be substantially reduced and the assembling process of the lighter of the present invention will be simplified to reduce the manufacturing cost of the lighter.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A lighter, comprising:

a lighter housing having a liquefied gas storage;

a gas emission unit for controlling a flow of gas, wherein said gas emission unit comprises a gas emitting nozzle extended from said liquefied gas storage;

a piezoelectric unit disposed in said lighter housing for generating sparks when said piezoelectric unit is depressed; and a lighter cap slidably coupled on top of said lighter housing at a position above said piezoelectric unit and being moved between a non-ignition position and an ignition position, wherein said lighter cap has a ceiling that an exit opening of said gas emitting nozzle is slidingly extended to embed in said ceiling of said lighter cap so as to protect said exit opening of said gas emitting nozzle at said non-ignition position, such that when said lighter cap is depressed at said ignition position to expose said exit opening of said gas emitting nozzle above said ceiling of said lighter cap, said piezoelectric unit is depressed and said gas emission unit is actuated at the same time for releasing the gas to be ignited by the sparks so as to produce a flame at said exit opening of said gas emitting nozzle, wherein said ceiling of said lighter cap entirely is an enlarged flat depressible surface that said exit opening of said gas emitting nozzle is not protruded from said flat depressible surface at said non-ignition position.

2. A lighter, comprising:

a lighter housing having a liquefied gas storage;

a gas emission unit for controlling a flow of gas, wherein said gas emission unit comprises a gas emitting nozzle extended from said liquefied gas storage;

a piezoelectric unit disposed in said lighter housing for generating sparks when said piezoelectric unit is depressed; and a lighter cap slidably coupled on top of said lighter housing at a position above said piezoelectric unit and being moved between a non-ignition position and an ignition position, wherein said lighter cap has a ceiling and a nozzle window downwardly extended from a ceiling of said light cap that an exit opening of said gas emitting nozzle is slidingly extended through said nozzle window to embed in said ceiling of said lighter cap so as to protect said exit opening of said gas emitting nozzle at said non-ignition position, such that when said lighter cap is depressed at said ignition position to expose said exit opening of said gas emitting nozzle above said ceiling of said lighter cap, said piezoelectric unit is depressed and said gas emission unit is actuated at the same time for releasing the gas to be ignited by the sparks so as to produce a flame at said exit opening of said gas emitting nozzle, wherein said lighter cap further comprises a limiting rim integrally formed at an inner circumferential surface of said nozzle window to engage with said gas emitting nozzle so as to limit an upward sliding movement of said lighter cap.

3. The lighter, as recited in claim 2, wherein said gas emitting nozzle has an annular retention hood formed at said exit opening of said gas emitting nozzle at a position above said limiting rim, such that when said lighter cap is upwardly moved, said limiting rim is engaged with a bottom edge of said retention hood to prevent said lighter cap from being further moved upwardly.

4. A lighter, comprising:

a lighter housing having a liquefied gas storage;

a gas emission unit for controlling a flow of gas, wherein said gas emission unit comprises a gas emitting nozzle extended from said liquefied gas storage;

a piezoelectric unit disposed in said lighter housing for generating sparks when said piezoelectric unit is depressed; and a lighter cap slidably coupled on top of said lighter housing at a position above said piezoelectric unit and being moved between a non-ignition position and an ignition position, wherein said lighter cap has a ceiling that an exit opening of said gas emitting nozzle is slidingly extended to embed in said ceiling of said lighter cap so as to protect said exit opening of said gas emitting nozzle at said non-ignition position, such that when said lighter cap is depressed at said ignition position to expose said exit opening of said gas emitting nozzle above said ceiling of said lighter cap, said piezoelectric unit is depressed and said gas emission unit is actuated at the same time for releasing the gas to be ignited by the sparks so as to produce a flame at said exit opening of said gas emitting nozzle, wherein said gas emitting nozzle has an annular retention hood formed at said exit opening of said gas emitting nozzle, wherein said retention hood has a top annular rim extended radially and outwardly, such that when said lighter cap is upwardly moved, said top annular rim of said retention hood is engaged with said ceiling of said lighter cap to prevent said lighter cap from being further moved upwardly.

5. The lighter, as recited in claim 4, wherein said lighter cap further has a nozzle window downwardly extended from said ceiling of said lighter cap and an indented cavity formed at said ceiling of said lighter cap around said nozzle window, such that when said lighter cap is upwardly moved, said top annular rim of said retention hood is received at said indented cavity to ensure said exit opening of said gas emitting nozzle to be aligned with said ceiling of said lighter cap.

6. A gas emission actuation device for a lighter which comprises a lighter housing having a liquefied gas storage and a piezoelectric unit disposed in the lighter housing for generating sparks when the piezoelectric unit is depressed, wherein said gas emission actuation device comprises:

a gas emission unit for controlling a flow of gas, wherein said gas emission unit comprises a gas emitting nozzle arranged for extending from the liquefied gas storage; and a lighter cap arranged for slidably coupling on top of the lighter housing at a position above the piezoelectric unit, wherein said lighter cap has a nozzle window downwardly extended from a ceiling of said lighter cap at a position that an exit opening of said gas emitting nozzle is extended through said nozzle window to embed in said ceiling of said lighter cap so as to protect said exit opening of said gas emitting nozzle, such that when said lighter cap is depressed to expose said exit opening of said gas emitting nozzle above said ceiling of said lighter cap, said lighter cap is arranged for depressing the piezoelectric unit and for actuating said gas emission unit at the same time to release the gas to be ignited by the sparks so as to produce a flame at said exit opening of said gas emitting nozzle, wherein said ceiling of said lighter cap entirely is an enlarged flat depressible surface that said exit opening of said gas emitting nozzle is not protruded from said flat depressible surface at said non-ignition position.

7. A gas emission actuation device for a lighter which comprises a lighter housing having a liquefied gas storage and a piezoelectric unit disposed in the lighter housing for generating sparks when the piezoelectric unit is depressed, wherein said gas emission actuation device comprises:

a gas emission unit for controlling a flow of gas, wherein said gas emission unit comprises a gas emitting nozzle arranged for extending from the liquefied gas storage; and a lighter cap arranged for slidably coupling on top of the lighter housing at a position above the piezoelectric unit, wherein said lighter cap has a nozzle window downwardly extended from a ceiling of said lighter cap at a position that an exit opening of said gas emitting nozzle is extended through said nozzle window to embed in said ceiling of said lighter cap so as to protect said exit opening of said gas emitting nozzle, such that when said lighter cap is depressed to expose said exit opening of said gas emitting nozzle above said ceiling of said lighter cap, said lighter cap is arranged for depressing the piezoelectric unit and for actuating said gas emission unit at the same time to release the gas to be ignited by the sparks so as to produce a flame at said exit opening of said gas emitting nozzle, wherein said lighter cap further comprises a limiting rim integrally formed at an inner circumferential surface of said nozzle window to engage with said gas emitting nozzle so as to limit an upward sliding movement of said lighter cap.

8. The gas emission actuation device, as recited in claim 7, wherein said gas emitting nozzle has an annular retention hood formed at said exit opening of said gas emitting nozzle at a position above said limiting rim, such that when said lighter cap is upwardly moved, said limiting rim is engaged with a bottom edge of said retention hood to prevent said lighter cap from being further moved upwardly.

9. A gas emission actuation device for a lighter which comprises a lighter housing having a liquefied gas storage and a piezoelectric unit disposed in the lighter housing for generating sparks when the piezoelectric unit is depressed, wherein said gas emission actuation device comprises:

a gas emission unit for controlling a flow of gas, wherein said gas emission unit comprises a gas emitting nozzle arranged for extending from the liquefied gas storage; and a lighter cap arranged for slidably coupling on top of the lighter housing at a position above the piezoelectric unit, wherein said lighter cap has a nozzle window downwardly extended from a ceiling of said lighter cap at a position that an exit opening of said gas emitting nozzle is extended through said nozzle window to embed in said ceiling of said lighter cap so as to protect said exit opening of said gas emitting nozzle, such that when said lighter cap is depressed to expose said exit opening of said gas emitting nozzle above said ceiling of said lighter cap, said lighter cap is arranged for depressing the piezoelectric unit and for actuating said gas emission unit at the same time to release the gas to be ignited by the sparks so as to produce a flame at said exit opening of said gas emitting nozzle, wherein said gas emitting nozzle has an annular retention hood formed at said exit opening of said gas emitting nozzle, wherein said retention hood has a top annular rim extended radially and outwardly, such that when said lighter cap is upwardly moved, said top annular rim of said retention hood is engaged with said ceiling of said lighter cap to prevent said lighter cap from being further moved upwardly.

10. The gas emission actuation device, as recited in claim 9, wherein said lighter cap further has an indented cavity formed at said ceiling of said lighter cap around said nozzle window, such that when said lighter cap is upwardly moved, said top annular rim of said retention hood is received at said indented cavity to ensure said exit opening of said gas emitting nozzle to be aligned with said ceiling of said lighter cap.

11. A lighter cap for a lighter which comprises a lighter housing having a liquefied gas storage, a gas emitting nozzle extended from the liquefied gas storage for controlling a flow of gas, and a piezoelectric unit disposed in the lighter housing for generating sparks when the piezoelectric unit is depressed, wherein said lighter cap comprises:

a cap body arranged for slidably coupling on top of the lighter housing at a position above the piezoelectric unit and being moved between a non-ignition position and an ignition position, wherein a ceiling of said cap body entirely forms an enlarged flat depressible surface to depress said cap body, such that said cap body is downwardly depressed from said non-ignition position to said ignition position for depressing the piezoelectric unit and for actuating the gas emitting nozzle at the same time to produce a flame at an exit opening of the gas emitting nozzle.

12. The lighter cap, as recited in claim 11, wherein said cap body further has a nozzle window downwardly extended from said ceiling of said lighter cap for embedding the exit opening of the gas emitting nozzle in said ceiling of said lighter cap so as to protect said exit opening of said gas emitting nozzle at said non-ignition position.

13. The lighter cap, as recited in claim 12, further comprising a limiting rim integrally formed at an inner circumferential surface of said nozzle window for engaging with the gas emitting nozzle so as to limit an upward sliding movement of said cap body.

14. The lighter cap, as recited in claim 12, further comprising a tubular heat resistance member coupled at said nozzle window for encircling around the exit opening of the gas emitting nozzle at said non-ignition position.

15. A method of assembling a lighter, comprising the steps of:

(a) forming a lighter housing with a liquefied gas storage therein;

(b) disposing a piezoelectric unit in said lighter housing for generating sparks when said piezoelectric unit is depressed;

(c) slidably coupling a lighter cap on top of said lighter housing at a position above said piezoelectric unit, wherein said lighter cap has a nozzle window downwardly extended from a ceiling of said lighter cap, wherein said entire ceiling of said lighter cap forms an enlarged flat depressible surface to depress said lighter cap; and (d) coupling a gas emitting nozzle at said lighter housing to communicate with said liquefied gas storage and extending said gas emitting nozzle through said nozzle window to embed an exit opening of said gas emitting nozzle in said ceiling of said lighter cap, such that when said lighter cap is downwardly depressed to expose said exit opening of said gas emitting nozzle above said ceiling of said lighter cap, said lighter cap depresses the piezoelectric unit and actuates the gas emitting nozzle at the same time to produce a flame at said exit opening of the gas emitting nozzle.

16. A method of assembling a lighter, comprising the steps of:

(a) forming a lighter housing with a liquefied gas storage therein;

(b) disposing a piezoelectric unit in said lighter housing for generating sparks when said piezoelectric unit is depressed;

(c) slidably coupling a lighter cap on top of said lighter housing at a position above said piezoelectric unit, wherein said lighter cap has a nozzle window downwardly extended from a ceiling of said lighter cap; and (d) coupling a gas emitting nozzle at said lighter housing to communicate with said liquefied gas storage and extending said gas emitting nozzle through said nozzle window to embed an exit opening of said gas emitting nozzle in said ceiling of said lighter cap, such that when said lighter cap is downwardly depressed to expose said exit opening of said gas emitting nozzle above said ceiling of said lighter cap, said lighter cap depresses the piezoelectric unit and actuates the gas emitting nozzle at the same time to produce a flame at said exit opening of the gas emitting nozzle, wherein an upward sliding movement of said lighter cap is limited by said gas emitting nozzle.

17. The method, as recited in claim 16, wherein the step (c) further comprises a step of integrally forming a limiting rim at an inner circumferential surface of said nozzle window to engage with said gas emitting nozzle so as to limit the upward sliding movement of said lighter cap.

18. The method, as recited in claim 17, wherein the step (d) further comprises a step of forming an annular retention hood at said exit opening of said gas emitting nozzle at a position above said limiting rim, such that when said lighter cap is upwardly moved, said limiting rim is engaged with a bottom edge of said retention hood to prevent said lighter cap from being further moved upwardly.

19. The method, as recited in claim 17, wherein the step (d) further comprises the steps of:

(d.1) forming an annular retention hood at said exit opening of said gas emitting nozzle; and (d.2) radially and outwardly extending a top annular rim at a top edge of said retention hood, such that when said lighter cap is upwardly moved, said top annular rim of said retention hood is engaged with said ceiling of said lighter cap to prevent said lighter cap from being further moved upwardly.

20. The method, as recited in claim 19, wherein the step (c) further comprises a step of forming an indented cavity at said ceiling of said lighter cap around said nozzle window, such that when said lighter cap is upwardly moved, said top annular rim of said retention hood is received at said indented cavity to ensure said exit opening of said gas emitting nozzle to be aligned with said ceiling of said lighter cap.

21. An ignition method of a lighter, comprising the steps of:

(a) embedding an exit opening of a gas emitting nozzle in a ceiling of a lighter cap at a non-ignition position that said lighter cap is slidably coupled on top of a lighter housing at a position above a piezoelectric unit; and (b) exposing said exit opening of said gas emitting nozzle from said ceiling of said lighter cap at an ignition position by applying a depressing force on said ceiling of said lighter cap to depress said piezoelectric unit and to actuate said gas emitting nozzle at the same time so as to produce a flame at said exit opening of said gas emitting nozzle, wherein said ceiling of said lighter cap entirely is an enlarged flat depressible surface that said exit opening of said gas emitting nozzle is not protruded from said flat depressible surface at said non-ignition position.

22. A lighter, comprising:

a lighter housing having a liquefied gas storage;

a gas emission unit for controlling a flow of gas, wherein said gas emission unit comprises a gas valve extended from said liquefied gas storage and a gas emitting nozzle detachably coupled with said gas valve;

a piezoelectric unit disposed in said lighter housing for generating sparks when said piezoelectric unit is depressed; and a lighter cap slidably coupled on top of said lighter housing at a position above said piezoelectric unit and being moved between a non-ignition position and an ignition position, wherein when said lighter cap is depressed from an non-ignition position to an ignition position, said piezoelectric unit is depressed and gas emitting nozzle is lifted upward at the same time for releasing the gas to be ignited by the sparks so as to produce a flame at an exit opening of said gas emitting nozzle, wherein said gas emission unit further comprises a gas actuating lever coupled to said gas valve at a position below a bottom of said gas emitting nozzle, such that when said gas actuating lever is pivotally actuated to lift up said gas emitting nozzle, said gas valve is driven to lift upward for releasing the gas to said gas emitting nozzle, wherein said gas emitting nozzle has a tubular coupling head extended downwardly, wherein said gas valve is slidably inserted into and sealed within said coupling head.

23. The lighter, as recited in claim 22, wherein one end of said gas actuating lever is coupled at said gas valve at a position below a bottom end of said coupling head, such that when said end of said gas actuating lever is pivotally lifted up, said coupling head is driven to move upward by said gas actuating lever in order to lift up said gas valve.

24. An ignition method of a lighter, comprising the steps of:

(a) embedding an exit opening of a gas emitting nozzle in a ceiling of a lighter cap at a non-ignition position that said lighter cap is slidably coupled on top of a lighter housing at a position above a piezoelectric unit; and (b) exposing said exit opening of said gas emitting nozzle from said ceiling of said lighter cap at an ignition position by applying a depressing force on said ceiling of said lighter cap to depress said piezoelectric unit and to actuate said gas emitting nozzle at the same time so as to produce a flame at said exit opening of said gas emitting nozzle, wherein said ceiling of said lighter cap entirely is an enlarged flat depressible surface that said exit opening of said gas emitting nozzle is not protruded from said flat depressible surface at said non-ignition position.

* * * * *